United States Patent [19]

Kawakami

[11] Patent Number: 5,652,489
[45] Date of Patent: Jul. 29, 1997

[54] MOBILE ROBOT CONTROL SYSTEM

[75] Inventor: Yuichi Kawakami, Itami, Japan

[73] Assignee: Minolta Co., Ltd., Japan

[21] Appl. No.: 518,819

[22] Filed: Aug. 24, 1995

[30] Foreign Application Priority Data

Aug. 26, 1994 [JP] Japan .................................. 6-201689

[51] Int. Cl.$^6$ ...................................................... G05D 1/02
[52] U.S. Cl. .......................... 318/587; 318/568.12; 901/1; 901/3
[58] Field of Search ........................... 318/560–686; 901/1, 3, 5, 7, 15–23; 364/424.02–424.06; 395/905, 913; 180/168–169

[56] References Cited

U.S. PATENT DOCUMENTS

| | | | |
|---|---|---|---|
| 4,473,787 | 9/1984 | Schick | 318/587 |
| 4,780,817 | 10/1988 | Lofgren | 364/424.01 |
| 4,802,096 | 1/1989 | Hainsworth et al. | 318/587 |
| 4,920,520 | 4/1990 | Gobel et al. | 367/99 |
| 5,036,935 | 8/1991 | Kohara | 318/587 |
| 5,179,329 | 1/1993 | Nishikawa et al. | 318/587 |
| 5,220,263 | 6/1993 | Onishi et al. | 318/587 |
| 5,280,431 | 1/1994 | Summerville et al. | 364/424.02 |
| 5,283,739 | 2/1994 | Summerville et al. | 364/424.02 |
| 5,434,490 | 7/1995 | Ishida et al. | 318/587 |
| 5,488,277 | 1/1996 | Nishikawa et al. | 318/587 |
| 5,548,511 | 8/1996 | Bancroft | 364/424.02 |

FOREIGN PATENT DOCUMENTS 7-16204  3/1995  Japan .

*Primary Examiner*—Paul Ip
*Attorney, Agent, or Firm*—Burns, Doane, Swecker & Mathis

[57] ABSTRACT

A mobile robot control system with plural mobile robots each of which moves along a predetermined route in the same area. One mobile robot gives way to the other mobile robot when the mobile robot receives a signal emitted by the other mobile robot. A mobile robot moving on a predetermined route has a sensor which senses whether or not an obstacle exists on the route. The sensor senses again after a predetermined time from the first sensing whether the sensor still detects the obstacle existing on the route at the first sensing.

14 Claims, 10 Drawing Sheets

ROBOT B 44
71
51
ROBOT A 43

ROBOT B
ROBOT A

ROBOT B
ROBOT A 60
61

60

MOBILE ROBOT CONTROL SYSTEM

BACKGROUND OF THE INVENTION

1. Field of the Invention

The present invention relates to a control system for controlling a plurality of autonomous mobile robots simultaneously in the same work area.

2. Description of the Related Art

Heretofore in the field of autonomous mobile robots, various types of mobile robots have been proposed wherein operation is automated by autonomous running on a predetermined route, and functions are added such as mobile drive units, sensor and mobile control units in addition to working units such as cleaners or lawnmowers found in cleaner robots, lawnmowing robots and the like.

Sensors for detecting surrounding conditions are provided in such autonomous mobile robots. When a sensor detects an obstacle which obstructs operation, the mobile robot stops before colliding with the obstacle, alerts an operator to the stopped condition, and waits until the operator removes the obstacle. In a more automated example, the autonomous mobile robot works continuously by automatically avoiding obstacles.

In the case of the previously described conventional mobile robots, consideration has not been given to situations wherein a plurality of mobile robots are operating in the same work area to increase the speed of the work and share different work. Thus, when mobile robots are mutually adjacent one to another, both robots will mutually wait when one or another of the robots recognizes the other as an obstacle, such that a deadlocked state is achieved wherein operation is interrupted over and over again.

If robot peers have the same obstacle avoidance function, they each respectively execute obstacle avoidance operations, thereby producing wasted operation and disrupting the running route more than necessary.

SUMMARY OF THE INVENTION

An object of the present invention is to provide a mobile robot capable of working without mutual collision or deadlock when a plurality of mobile robots are operating in the same work area, and which is further capable of minimal disruption of disruption of the running route.

These and other objects, advantages and features of the present invention will become apparent from the following description thereof taken in conjunction with the accompanying drawings which illustrate specific embodiments of the invention.

The present invention provides a hazard signal emitter and hazard signal receiver for a plurality of mobile robots, so as to prevent mutual collision and avoid deadlock among a plurality of mobile robots by having said mobile robots mutually receive hazard signals.

BRIEF DESCRIPTION OF THE DRAWINGS

In the following description, like parts are designated by like reference numbers throughout the several drawings.

DETAILED DESCRIPTION OF THE PREFERRED EMBODIMENTS

The preferred embodiments of the present invention are described hereinafter in examples mobile floor cleaning robots with reference to the accompanying drawings. In the following description the mobile floor cleaning robots are referred to as simply as mobile robots.

Figure 1:
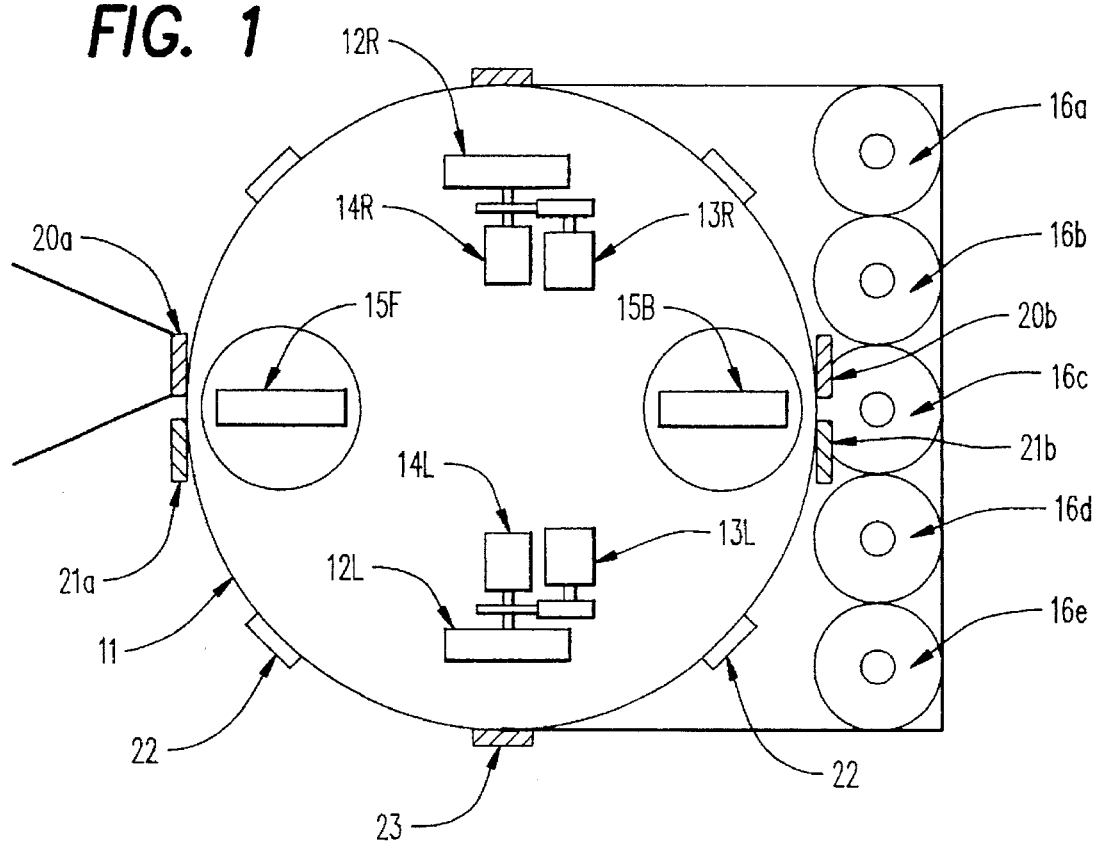
FIG. 1 is a bottom view of an embodiment of the mobile robot of the present invention.
Figure 2:
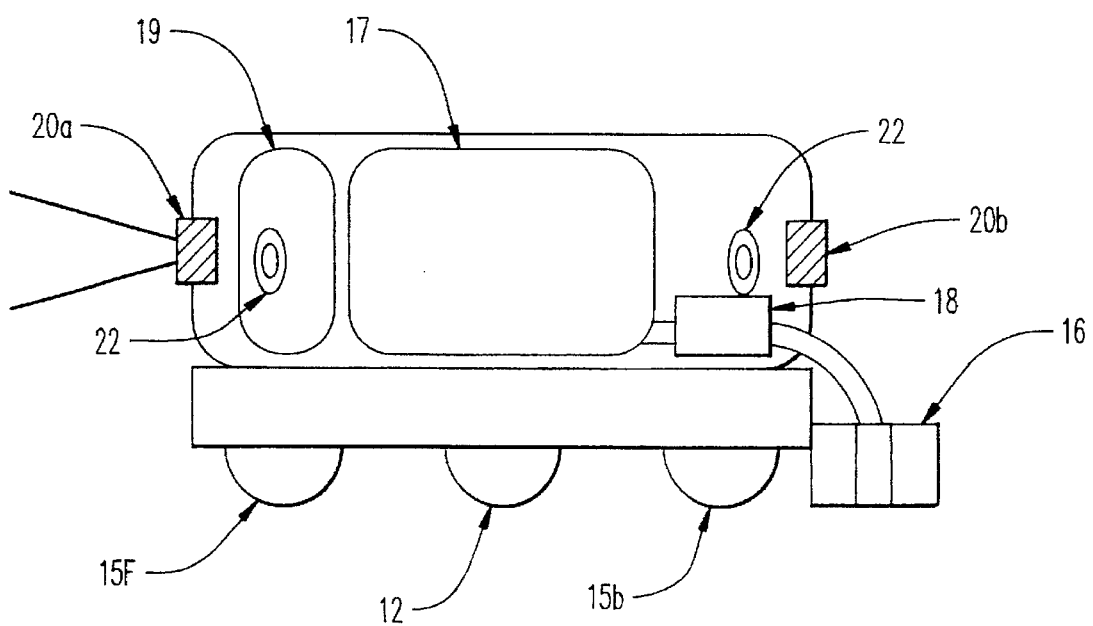
FIG. 2 is a longitudinal section view of said mobile robot.

FIGS. 1 and 2 show the general construction of a mobile robot of a first embodiment of the invention. This mobile robot normally runs toward the left side in the drawings. In FIG. 1, reference number 11 refers to the body of the mobile robot, reference numbers 12L and 12R refer to drive wheels respectively disposed on the left and right sides of the bottom of body 11, which are independently driven by drive motors 13L and 13R, respectively. Reference numbers 14L and 14R refer to rotation detectors comprising rotary encoders connected to the respective drive wheels, which detect the number of shaft rotations of drive wheels 12L and 12R. Central processing unit (hereinafter referred to as "CPU") 19 (described later) measures the running distance based the detected number of shaft rotations of drive wheels 12L and 12R to detect the mobile robot position. Reference numbers 15F and 15B refers to are driven wheels mounted at the front and back on the bottom of body 11.

The drive section which moves body 11 comprises drive wheels 12L and 12R, drive motors 13L and 13R, driven wheels 15F and 15B.

Reference numbers 16a–16e refer to sponges mounted at the back of body 11, and are of a cylindrical type the bottom surface of which is pressed against the floor. Sponges 16a–16e are respectively rotated by a motor not shown in the drawing so as to scrub the floor surface. Sponges 16a–16e are movable in a vertical direction so as to be placed in contact with the floor surface and retracted therefrom as needed.

In FIG. 2, reference number 17 refers to a cleaning fluid tank disposed inside body 11. The cleaning fluid accommodated in the tank is delivered to sponges 16a–16e by pump 18, and is dripped on the floor surface from holes provided in the center of said sponges 16a–16e. The cleaning unit comprises sponges 16a–16e, cleaning fluid tank 17, and pump 18.

The mobile robot having the previously described construction applies cleaning fluid while sponges 16a–16e rub the floor surface and body 11 is moved by the drive section, so as to clean a predetermined range. The aforesaid cleaning section is described in detail in U.S. patent application Ser. No. 08/420,652.

Reference number 19 refers to a controller comprising CPU which controls the entire mobile robot. Reference numbers 20a and 20b are obstacle sensors using ultrasound or infrared light (these sensors are described in detail later), and detect obstacles in the direction of movement of the mobile robot by a noncontact method. When the robot advances in a forward direction, obstacle sensor 20a detects obstacles, whereas when the robot advances in a backward direction, obstacle sensor 20b detects obstacles. Obstacle sensors 20a and 20b output hazard signals (described later) when an obstacle is present within the detection range (described later).

Reference numbers 21a and 21b are hazard signal emitters, which emit hazard signals using infrared light relative to a second mobile robot present in the movement direction of a first mobile robot. Reference number 22 refers to hazard signal receivers of infrared sensors, a plurality of which are provided around the mobile robot body, and which are capable of receiving hazard signals emitted form another mobile robot from various directions around the first mobile robot body. Reference number 23 refers to obstacle sensors using ultrasound or infrared light identical to obstacle sensors 20a and 20b, and which are mounted on the sides of the body to detect obstacles at the sides of the mobile robot without contact.

The obstacle sensors are described in detail below.

The obstacle sensors using ultrasound comprise an ultrasound emitter and an ultrasound receiver, wherein an ultrasonic signal is emitted from the emitter in the direction in which obstacle detection is desired, and ultrasonic signals reflected by an object are received by the receiver. At this time, CPU 19 detects the distance to the obstacle based on the time from the emission of the ultrasonic signal until its reception.

Obstacle sensors using infrared light comprise infrared signal emitters and infrared signal receivers wherein an infrared signal is emitted from the emitter in the direction in which obstacle detection is desired, and infrared signals reflected by an object are received by the receiver, similar to the previously described obstacle sensors using ultrasound. At this time, CPU 19 detects the distance to the obstacle based on the intensity of the infrared light received by the receiver.

In both of the aforesaid methods, the obstacle detection range can be set by regulating the spread of the ultrasound or infrared signal used for the signal.

Figure 3:
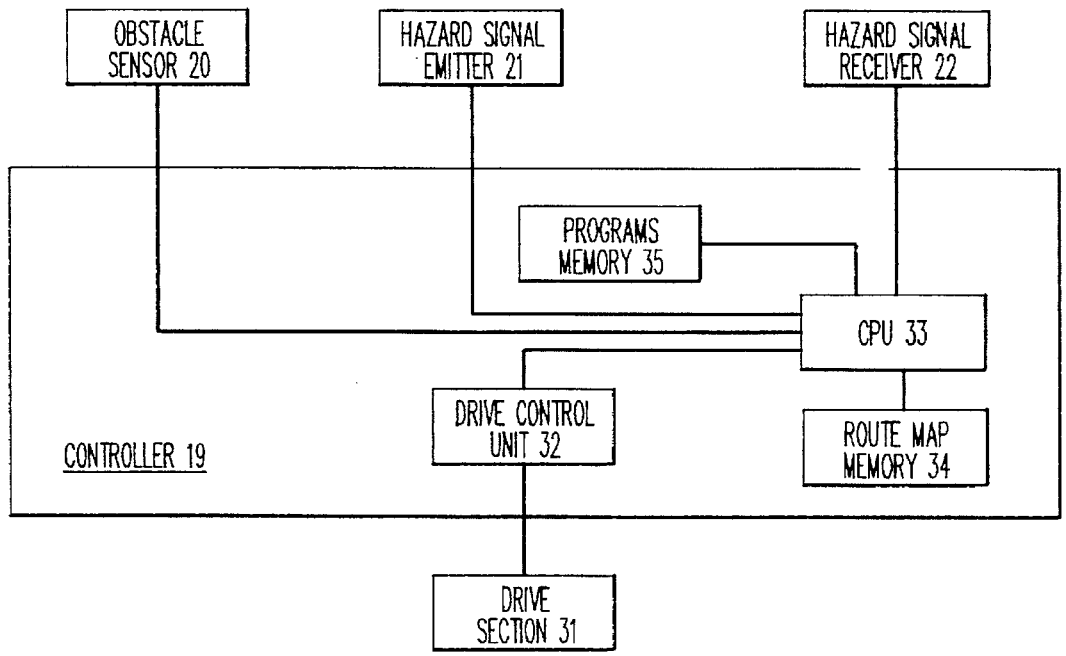
FIG. 3 is a block diagram showing the control block of said mobile robot.

FIG. 3 is a block diagram showing the inside of controller 19. In the drawing, reference number 31 refers to the drive section comprising drive wheels 12L and 12R, drive motors 13L and 13R, and driven wheels 15F and 15B in FIG. 1. Drive section 31 is controlled by drive control unit 32 via commands issued from CPU 33.

CPU 33 operates in accordance with programs stored in program memory 35. For example, in regard to commands for drive section 31, programs created to run a mobile robot along a route stored in route map memory 34 are stored in program memory 35. CPU 33 receives the output of obstacle sensor 20, and changes the suitable running route while measuring the distance to the obstacle in the direction of movement, so as to accomplish the obstacle avoidance operation. CPU 33 emits hazard signals in the direction of movement by means of hazard signal emitter 21 when obstacle is detected by obstacle sensor 20. CPU 33 receives hazard signals emitted from another mobile robot via hazard signal receiver 22.

Obstacle sensor 20 and hazard signal emitter 21 are mounted in the front side and back side, and the sensors used are selectable by controller 19 in accordance with the direction of movement.

Figure 4:
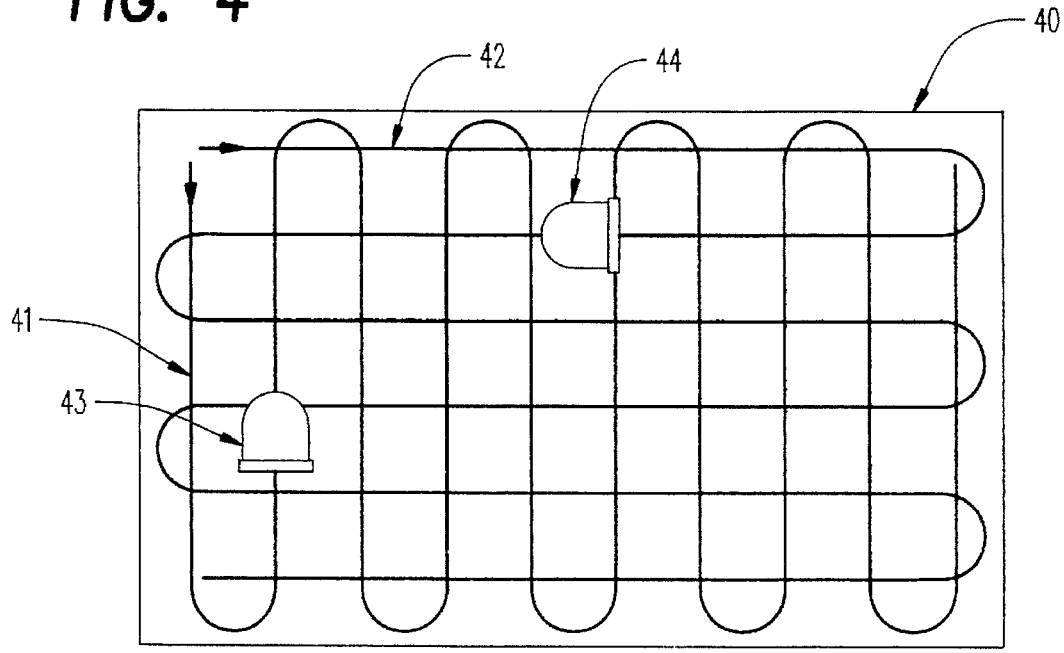
FIG. 4 shows the running route of the mobile robot.

The operation when a plurality (two robots) of mobile robots are operating is described hereinafter with reference to the drawings. FIG. 4 shows the routes of mobile robot A 43 and mobile robot B 44. The respective mobile robots are provided with work routes 41 and 42 so as to clean identical rectangular ranges 40. Work route 41 of mobile robot A 43 is set so as to clean the entire rectangular range 40 starting from the top left of rectangular range 40 by having mobile robot A 43 zigzag in a vertical direction. Work route 42 of mobile robot B 44 is set so as to clean the entire rectangular range 40 starting from the top left of rectangular range 40 by having mobile robot B 44 zigzag in a horizontal direction.

Thus, double cleaning is accomplished without gaps by having two mobile robots clean vertically and horizontally. Since both mobile robot A 43 and mobile robot B 44 work simultaneously, the working time is reduced compared to vertical and horizontal cleaning by a single mobile robot. Special routes for simultaneous working by two mobile robots are unnecessary because the same route can be used when each mobile robot works independently.

When obstacle sensors 20a and 20b detect an obstacle in the route while a mobile robot is working, the mobile robot avoids the obstacle by changing the work route, and continues working.

If an obstacle detected in the work route is a stationary obstacle, the work route is changed as described above, and work continues without stopping. However, this method is basically undesirable insofar as some residual work area remains due to the avoidance operation. Therefore, it is desirable that collision with an obstacle be avoided without changing the work route when an obstacle is movable as in the case of another mobile robot.

Thus, the present embodiment uses a method for avoiding collision without changing the route when an obstacle detected in the forward direction is another mobile robot, by providing hazard signal send/receive functions.

Figure 5A:
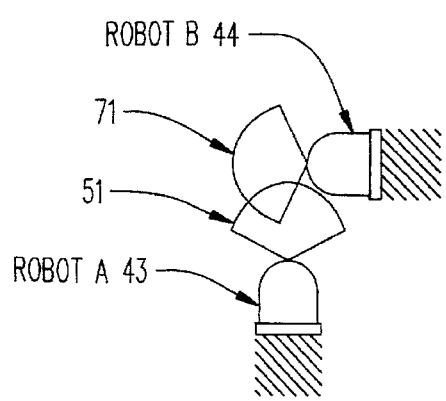
FIGS. 5a–5e illustrate the collision avoidance operation of said mobile robot.

Hereinafter, is described the collision avoidance operation of the mobile robot of the present embodiment with reference to FIGS. 5a–5e, and the flow chart of FIG. 6. In FIG. 5a, reference number 43 refers to mobile robot A, reference number 44 refers to mobile robot B, reference number 51 refers to the detection range of the obstacle sensor provided on mobile robot A, and reference number 71 refers to the detection range of the obstacle sensor provided on mobile robot B. Detection ranges 51 and 71 spread forward in a fan-shape in the direction of movement of the mobile robot, so as to detect an obstacle present within a constant distance relative to the direction of movement via said obstacle sensors.

For example, the positional relationship shown in FIG. 5a expresses the point in time at which mobile robot A detects mobile robot B as an obstacle in front of said mobile robot A.

Figure 6:
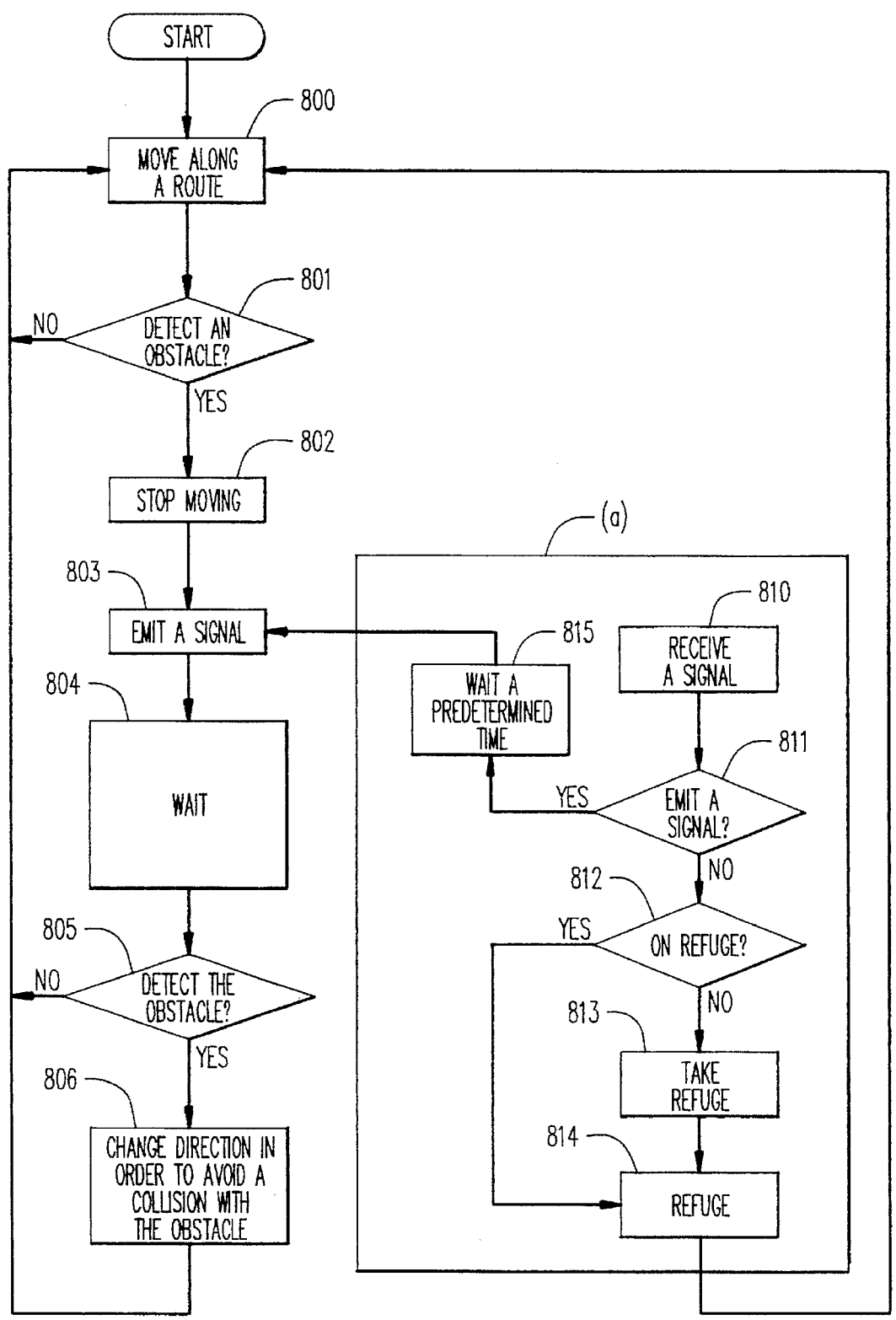
FIG. 6 is a flow chart of the collision avoidance operation of said mobile robot.

Mobile robots A and B are programmed to operate together as shown in the flow chart of FIG. 6. The part shown in FIG. 6a is an interrupt routine, which normally causes the routine to jump to step 810 when a mobile robot receives a hazard signal (details described later).

Figure 5B:
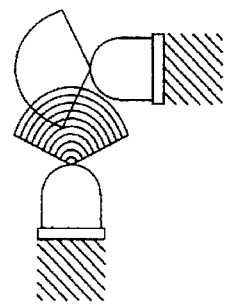

Normally (when an obstacle is not detected in step 801), the mobile robots A and B both repeat steps 800 and 801 to accomplish work while running on their normal routes. When mobile robot A detects an obstacle in the forward direction, it temporarily stops (step 802), and emits a hazard signal (step 803). The positional relationship at this time is shown in FIG. 5b.

Mobile robot A enters a wait state for a predetermined time in step 804. At this time, mobile robot B, which has received the hazard signal emitted from mobile robot A, jumps to step 810 via the aforesaid interrupt, and in step 811 a determination is made as to whether or not mobile robot itself has emitted a hazard signal. In the positional relationship shown in FIG. 5b, mobile robot B does not detect an obstacle in the forward direction, such that mobile robot B does not emit a hazard signal. Accordingly, in such a circumstance, mobile robot B advances to step 812.

Figure 5C:
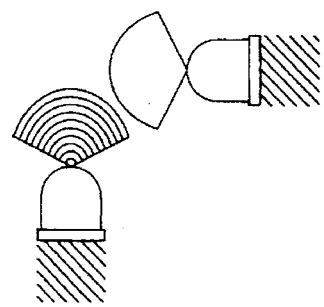
Figure 5D:
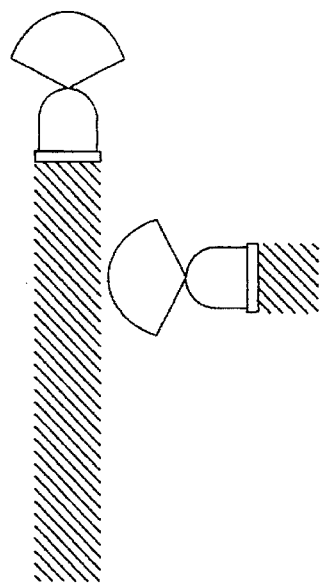

In step 812, a determination is made as to whether or not the present robot is on refuge (i.e., a state wherein the present robot gives way to the route of the other robot). Since mobile robot B is not on refuge at this time, the routine continues to step 813, the robot retreats a predetermined distance, and moves to the refuge state in step 814. The positional relationship at this time is shown in FIG. 5c. The obstacle sensors do not operate during the time mobile robot B is on refuge.

Figure 5E:
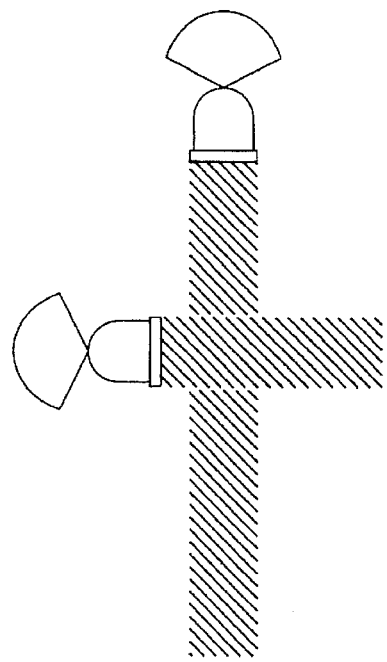

In step 804, mobile robot A which is in the wait state advances to step 805 after the predetermined time has elapsed, whereupon the obstacle detecting operation is again performed. Mobile robot A selectably performs an obstacle avoidance operation or continues normal route operation depends on the result of the aforesaid obstacle detecting operation. In the example, the robot recognizing an obstacle is mobile robot B, such that mobile robot B enters the refuge state and backs up, and in step 805 mobile robot A detects no obstacle in the forward direction at the point in time when it again performs the obstacle detecting operation. In this case, mobile robot A returns to normal route running of step 800. The positional relationship at this time is shown in FIG. 5e. Mobile robot B continues in the wait state for a predetermined time, then returns to step 800 and continues normal operation as shown in FIG. 5e.

When the obstacle is a stationary object, mobile robot A detects the presence of the obstacle when it again performed the obstacle detecting operation in step 805 because the position of the obstacle has not changed while mobile robot A was waiting. In this circumstance, mobile robot A advances to step 806, and the obstacle avoidance operation is performed.

The time of the wait state in step 804 is set for the time required for the mobile robot which received the hazard signal (mobile robot B in the above example) to retreat a predetermined distance and enter the refuge state. The refuge state of step 814 is set for a time greater than necessary for the mobile robot which emitted the hazard signal (mobile robot A in the above example) to avoid or pass the obstacle in the forward direction, such that the mobile robot (mobile robot B in the above example) enters the refuge state. The hazard signal output during obstacle detection is regulated as to the output of the hazard signal emitter and sensitivity of the hazard signal receiver of the mobile robots within the detection range.

In the previously described example, mobile robot A must stop at the point in time an obstacle is detected within the detection range because the obstacle detection range is set to a narrow range in the direction of movement. The similar effectiveness may be achieved by enlarging the detection range, and by reducing the speed of advancement of mobile robot A when an obstacle is detected within the detection range by mobile robot A.

Figure 7A:
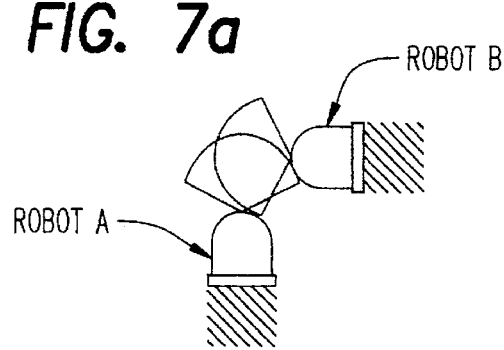
FIGS. 7a–7g illustrate the collision avoidance operation of said mobile robot.
Figure 7B:
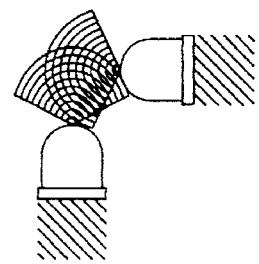

Mobile robots A and B detect another mobile robot simultaneously when mobile robots A and B mutually approach one another from side of the mobile robots is described below with reference to FIGS. 7a–7g and the flow chart of FIG. 6. FIG. 7a shows the state wherein mobile robots A and B simultaneously detect one another. From this state, both mobile robots advance through steps 801, 802, and 803 and emit hazard signals in the same manner as shown in FIG. 5 (FIG. 7b).

Figure 7C:
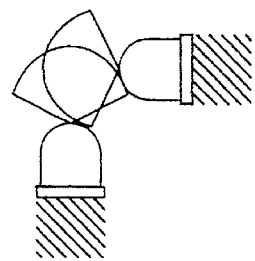

In this instance, mobile robots A and B simultaneously receive the hazard signal emitted form the other robot, such that the routine jumps to step 810. At this time, the routine advances from step 811 to step 815 because both mobile robots A and B both emit hazard signals, then the routine continues to step 803 after a predetermined interval has elapsed. This state is shown in FIG. 7c. Both mobile robots A and B stop emitting hazard signals when the routine advances to step 815.

Figure 7D:
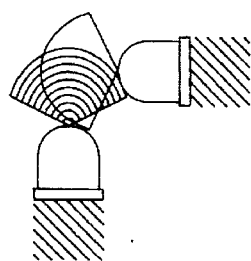

The time interval of step 815 is preset for a different duration for each robot. Thus, one or another of the mobile robots advances more quickly to step 803 and again emits a hazard signal. For example, when mobile robot A advances to step 803 and emits a hazard signal, mobile robot B receives the hazard signal emitted by said robot A and the routine again jumps to step 810. This condition is shown in FIG. 7d.

Figure 7E:
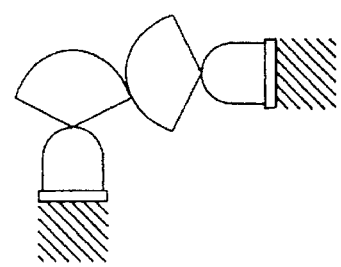

This time, mobile robot B continues from step 811 to step 812 because it does not emit a hazard signal. In step 812, a determination is made as to whether or not robot B is currently in a refuge state. At this time, the routine advances to step 813 because mobile robot B is not in a refuge state, and after backing up a predetermined distance enters a refuge state in step 814. This state is shown in FIG. 7e.

Figure 7F:
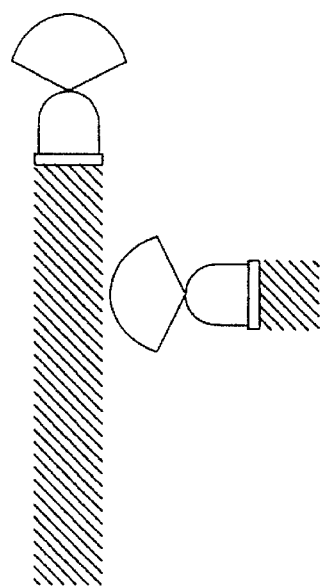

Mobile robot A again performs an obstacle detection operation in step 805 after the wait state of step 804 which follows the hazard signal emission just as in the previous example. Since mobile robot B is in the refuge state at this time, an obstacle is not detected in the forward direction, the routine continues from step 805 to step 800, and normal running continues. This state is shown in FIG. 7f.

Figure 7G:
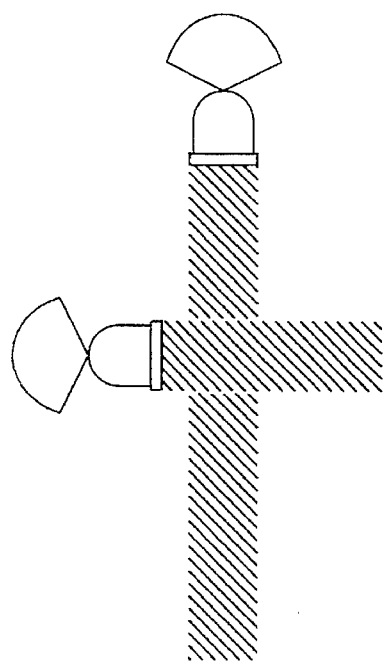

After the predetermined time of the refuge state has elapsed, mobile robot B also continues to step 800, and continues normal operation as shown in FIG. 7g.

Thus, when emission and reception of hazard signals occur simultaneously, the hazard signal emission of one robot is given priority by presetting in each mobile robot different values for the time interval for again emitting a hazard signal. Accordingly, when two mobile robots mutually detect one another simultaneously, only one mobile robot moves to yield its route to the other robot, so as to prevent the deadlock resulting from both robots mutually yielding their routes to the other. Similar effectiveness is achieved by randomly setting the time interval until hazard signals are again emitted.

Furthermore, similar effectiveness is achieved by presetting in each mobile robot different values for the time interval from detecting an obstacle to emitting a hazard signal, or randomly setting said values.

There may be occasions when changing the direction of retreat by a direction adjacent to the peer mobile robot may be more effective. In the present embodiment, hazard signal receivers are mounted all around the robot body so as to be capable of receiving hazard signals from all directions, such that the direction from which a hazard signal emanates can be detected when any one of said hazard signal receivers receives a signal.

Conditions when mobile robots A and B mutually approach one another from the front of the mobile robots are described below with reference to FIGS. 8a–8g.

Figure 8A:
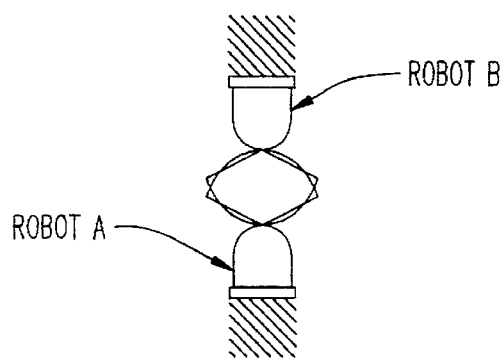
FIGS. 8a–8g illustrate the collision avoidance operation of said mobile robot.
Figure 8B:
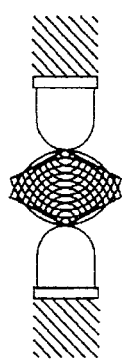
Figure 8C:
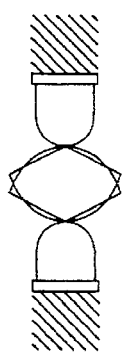
Figure 8D:
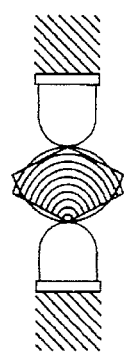
Figure 8E:
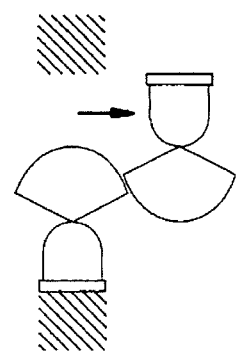
Figure 8F:
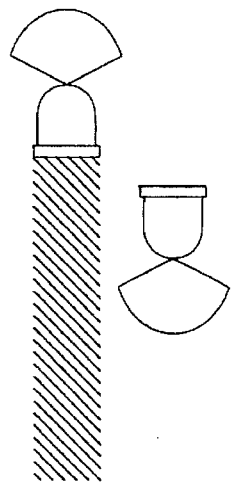
Figure 8G:
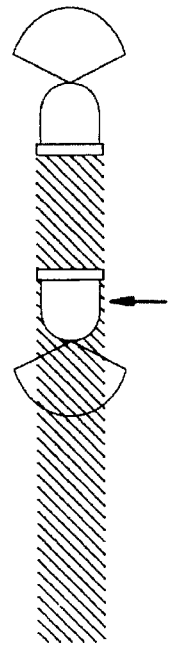

The movement from FIG. 8a to FIG. 8c is identical to that described in FIGS. 7a–7c. In FIG. 8d, mobile robot B receives a hazard signal from mobile robot A from the front surface in the direction of movement. In this instance, mobile robot B yields the running route to mobile robot A via a refuge operation by moving in a horizontal direction (FIG. 8e). After stopping a predetermined time at the position of FIG. 8f, mobile robot B returns to the normal route by moving in a horizontal direction (FIG. 8g).

Figure 9:
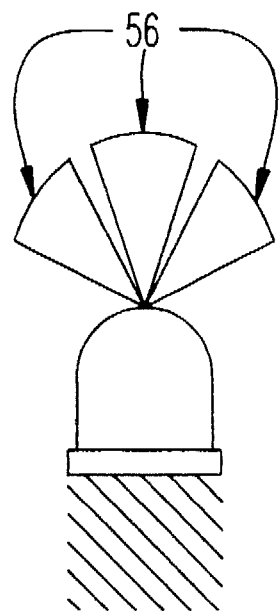
FIG. 9 shows the obstacle sensors detection ranges.

Consider a method for determining the direction of refuge wherein the detection region 56 is divided, as shown in FIG. 9. In this method, the direction of refuge is changed in accordance with the direction of a detected obstacle when a hazard signal is received by using obstacle sensors capable of detecting the direction of an obstacle.

Figure 10:
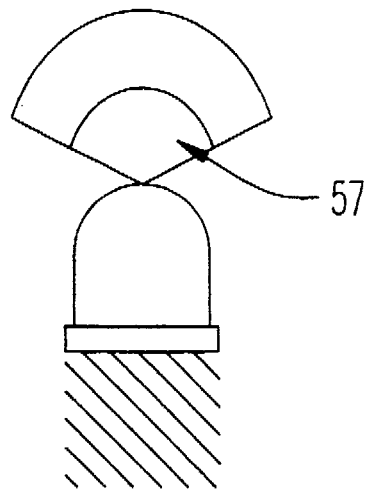
FIG. 10 shows the obstacle sensor provided with two hazard regions.

Obstacle sensors are provided with a second detection range 57 on the side near the robot in the detection range, as shown in FIG. 10. Consider an obstacle detecting device constructed such that when the obstacle sensor detects an obstacle present in the second detection range, a second hazard signal is emitted in the direction of movement. When a first hazard signal emitted by another mobile robot is received, the mobile robot decreases speed or stops to yield the route to the other robot, and when a second hazard signal is received said first mobile robot yields its route to the other mobile robot by a refuge operation accomplished by backing up or moving in a horizontal direction.

Although the present embodiment has been described in terms of two mobile robots, it is to be understood that similar effectiveness may be achieved when three or more mobile robots move in the same area.

A second embodiment comprising a modification of the first embodiment is described hereinafter. Parts common to both first and second embodiments are omitted from this discussion, and only aspects unique to the second embodiment are described.

The second embodiment presumes two mobile robots move within the same area. One mobile robot is provided with only a hazard signal emitter, and the other mobile robot is provided with only a hazard signal receiver.

The mobile robot with the signal emitter (hereinafter referred to as robot A) is identical to the mobile robot of the first embodiment with the exception that hazard signal receiver 22 is omitted. The mobile robot with the signal receiver (hereinafter referred to as robot B) is identical to the mobile robot of the first embodiment with the exception that signal emitter 21 is omitted.

When mobile robot A detects an obstacle, a hazard signal is emitted in the direction of the detected obstacle, and the robot enters the wait state. After a predetermined time has elapsed, mobile robot A again performs the obstacle detection operation. To perform the obstacle avoidance operation or resume the normal route is selected in accordance with the results of the aforesaid second obstacle detection operation. If mobile robot A recognizes mobile robot B as an obstacle, mobile robot B enters the refuge state such that the obstacle in the forward direction is removed. In this case, mobile robot A returns to the normal route.

When an obstacle is a stationary object, the position of said obstacle does not change during the time mobile robot A is waiting, such that said obstacle is still present when mobile robot A again performs the obstacle detection operation. In this case, mobile robot A performs the obstacle avoidance operation.

When mobile robot B receives a hazard signal, it enters the refuge state and yields the route to mobile robot A in accordance with the direction of the received hazard signal (e.g., when a hazard signal is received from a horizontal direction, the refuge state is entered by backing up). After a predetermined time has elapsed, mobile robot B resumes the normal route.

When mobile robot B detects an obstacle in the direction of movement and a hazard signal is not received, the detected obstacle is understood to be a stationary object and not mobile robot A. In this case, mobile robot B performs an obstacle avoidance operation.

Thus, in the case of two mobile robots, if one robot emits a hazard signal and the other robot receives a hazard signal, control is simpler than that of the first embodiment because when two mobile robots approach one another, the hazard signal receiving robot (mobile robot B in the previous example) always yields the route.

Specific examples of the previously mentioned hazard signal emitters 21a and 21b, hazard signal receiver 22, and obstacle sensors 20a and 20b are described below.

Figure 11:
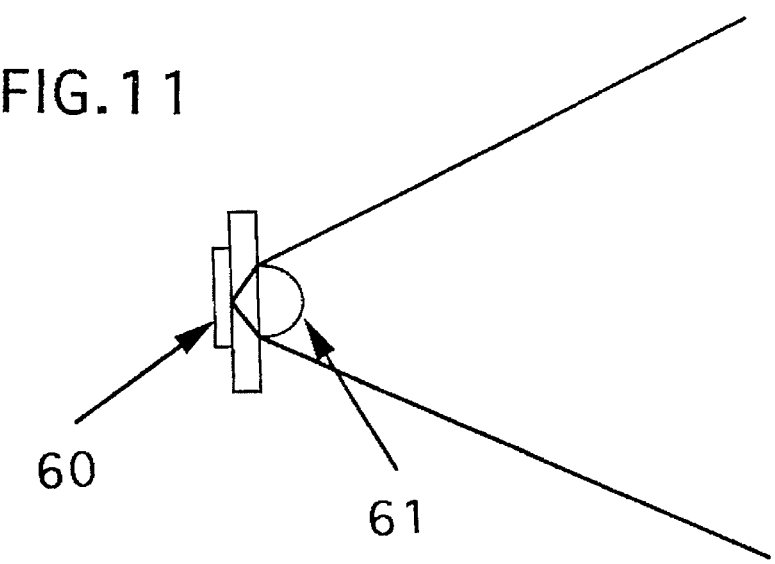
FIG. 11 shows a hazard signal emitter.

FIG. 11 shows details of hazard signal emitters 21a and 21b. This signal emitter comprises an infrared emitting device 60 and a lens 61 disposed in front of said infrared emitting device. The infrared light emitted from the infrared emitting device 60 is spread by the lens 61. The width of the emitted light is changed by adjusting the lens unit.

Figure 12:
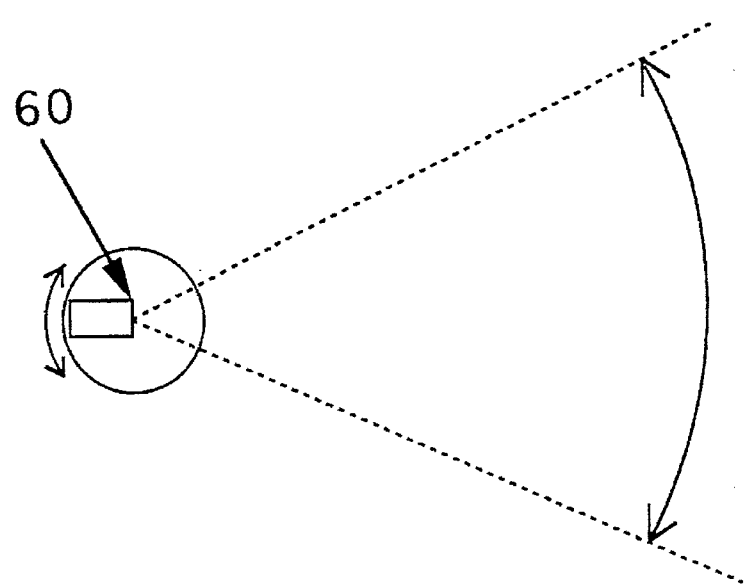
FIG. 12 shows a hazard signal emitter.

FIG. 12 shows another example of a hazard signal emitter. This signal emitter comprises an infrared emitting device 60 which emits a beam of infrared light, and a rotating member which rotates said infrared emitting device. The infrared beam scans in a horizontal direction by rotating the rotating member at a predetermined angle to left and right. The scanning width of the infrared beam is changed by adjusting the angle of rotation of the rotating member.

Commonly used infrared photoreceptor elements may be used in hazard signal receiver 22. In the present embodiment, silicon photo cells (SPC) are used.

Figure 13:
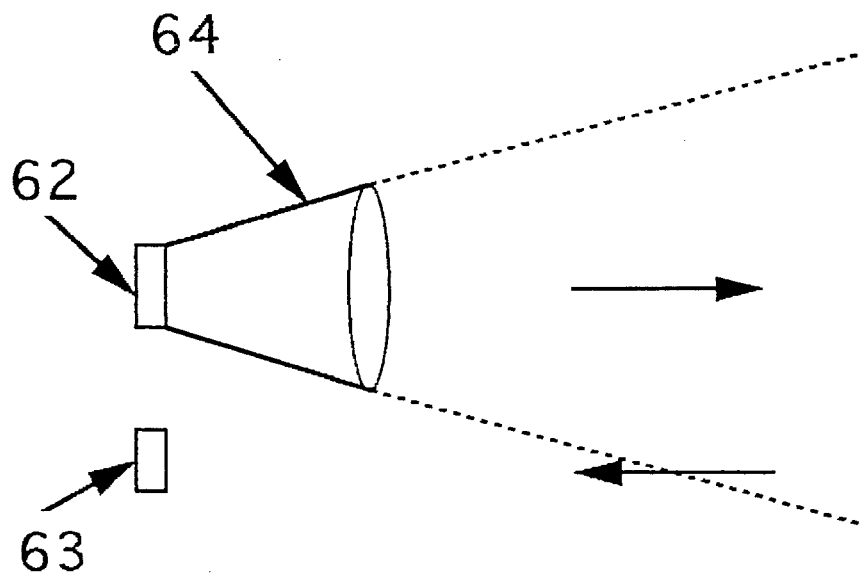
FIG. 13 shows an obstacle sensor using ultrasound.

FIG. 13. shows details of an obstacle sensor using ultrasound. This obstacle sensor comprises a ultrasonic emitter 62, a cone 64 disposed in front of the ultrasonic emitter 62, and an ultrasonic receiver 63. The signal wave emitted form the ultrasonic emitter 62 is spread by the cone 64 and arrives at an obstacle. The ultrasonic wave reflected by said obstacle is received by the ultrasonic receiver 63. CPU 33 calculates the time from the emission of the ultrasonic wave by the ultrasonic emitter 62 until the reception of the reflected wave by the ultrasonic receiver 63. CPU 33 measures the distance to the obstacle based on the aforesaid calculated time. The obstacle detection range is set by adjusting the angle of spread of the cone 64.

Figure 14:
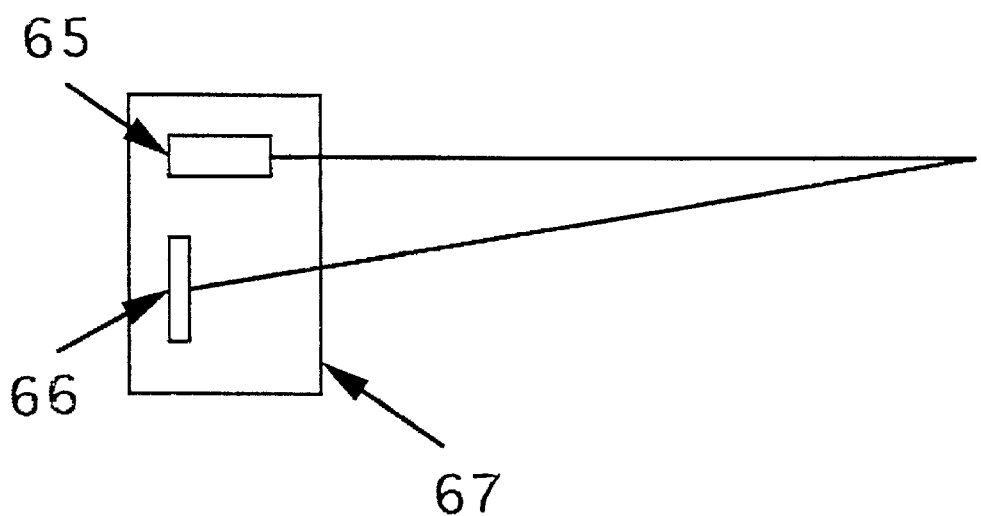
FIG. 14 shows an obstacle sensor using infrared rays.

FIG. 14 shows details of an obstacle sensor using infrared light. This obstacle sensor is a rangefinder 67 comprising an infrared emitter 65 which emits an infrared light beam, and a linear sensor 66 formed of infrared photoreceptor elements. The infrared beam emitted from the infrared emitter 65 is reflected by the obstacle. The reflected light is received by the linear sensor 66. CPU 33 measures the distance to the obstacle based on the light position on the linear sensor.

Figure 15:
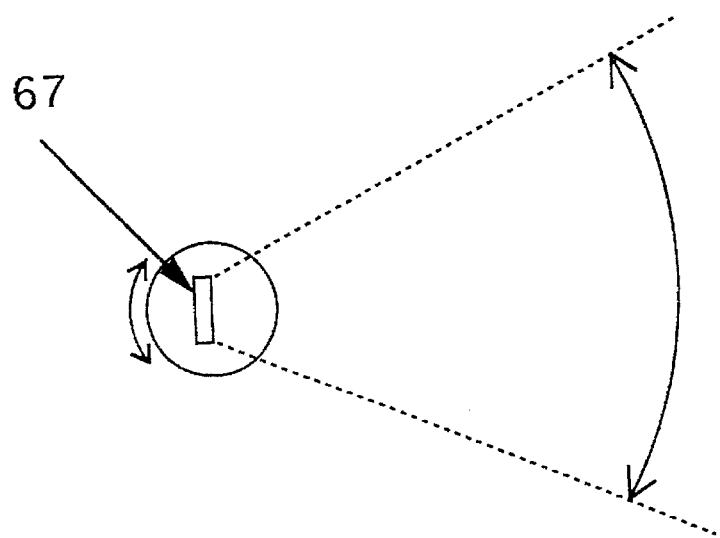
FIG. 15 shows an obstacle sensor using infrared rays.

As shown in FIG. 15, the rangefinder 67 of FIG. 14 is arranged on a rotating member, and the infrared beam scans in a horizontal direction by rotating said rotating member only a predetermined angle to left and right. The obstacle detection range is set by adjusting the angle of rotation of the rotating member.

Figure 16:
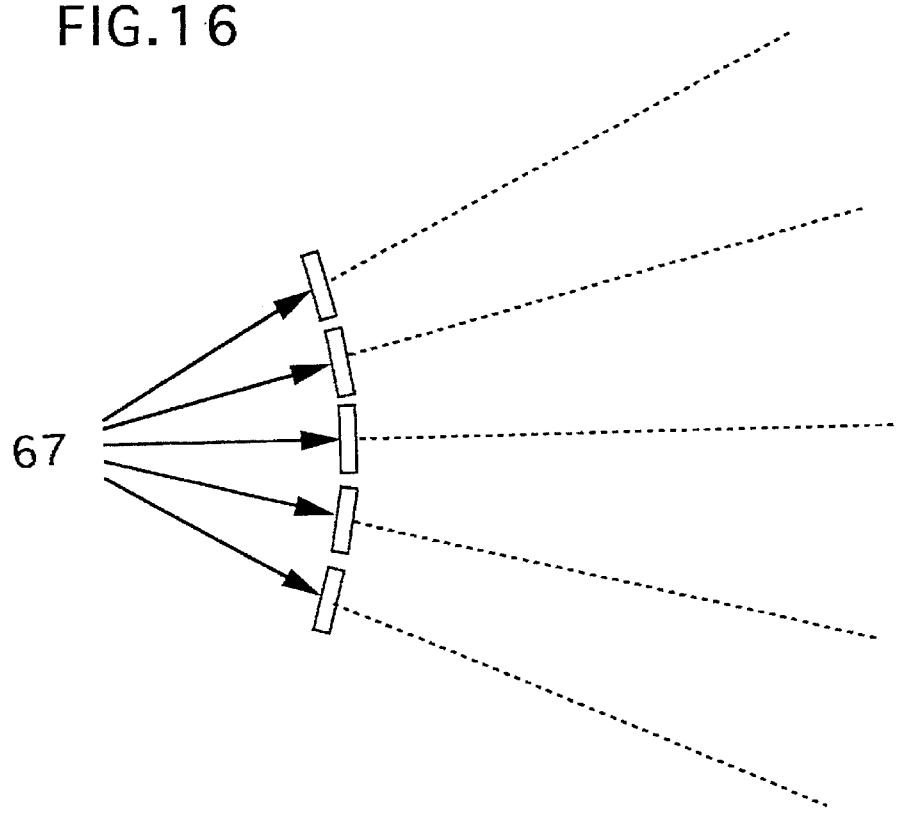
FIG. 16 shows an obstacle sensor using infrared rays.

As shown in FIG. 16, this method may be used for obstacle detection in a wide range by arranging a plurality of rangefinder 67 of FIG. 14. In this case, the obstacle detection range is set by adjusting the number of rangefinders 67.

As previously described, the present invention performs an avoidance operation relative to obstacles which must be avoided, eliminates the deadlock state when a mobile robot approaches a peer mobile robot by causing one robot to yield its route. That is, the present invention realizes a mobile robot which does not performs needless avoidance operations when avoiding collisions among a plurality of mobile robots operating in the same work area.

Furthermore, when hazard signal emission and hazard signal reception by another mobile robot occur simultaneously, one mobile robot invariably yields its route to another mobile robot by reception of another hazard signal.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A mobile robot moving on a predetermined route, comprising:

a propulsion device;

a sensor which senses whether or not an obstacle exists on the route; and a controller which controls the propulsion device to stop moving the mobile robot when the sensor detects the obstacle, and which controls the sensor to sense again after predetermined time from the first sensing whether the sensor still detects the obstacle existing on the route at the first sensing.

2. A mobile robot as claimed in claim 1, wherein the controller further controls the propulsion device to change direction of movement of the robot in order to avoid a collision with the obstacle when the sensor detects the obstacle again at the second sensing.

3. A mobile robot as claimed in claim 1, wherein the controller controls the propulsion device to start moving the robot when the sensor detects that no obstacle exists on the route at the second sensing.

4. A mobile robot control system with plural mobile robots comprising:

first and second mobile robots each of which moves along a predetermined route in a common area;

a first signal emitter on said first mobile robot which emits a signal representing a position of said first mobile robot;

a second signal emitter on said second mobile robot which emits a signal representing a position of said second mobile robot;

a first signal receiver on said first mobile robot which receives a signal emitted by said second signal emitter;

a second signal receiver on said second mobile robot which receives a signal emitted by said first signal emitter; and a controller which controls the second mobile robot to give way to the first mobile robot when said second signal receiver receives the signal emitted by said first signal emitter wherein, if said second signal receiver receives the signal from said first signal emitter during an emitting period of said second signal emitter, said second signal emitter stops emitting for a predetermined time.

5. A mobile robot control system as claimed in claim 4, wherein said second signal emitter emits its signal again after the predetermined time if no signal is received by said second signal receiver during the predetermined time.

6. A mobile robot control system as claimed in claim 4, wherein the controller controls the mobile robot to give way to the first mobile robot when the signal receiver of the second mobile robot receives the signal from said first signal emitter while the signal emitter of the second mobile robot emits no signal.

7. A mobile robot control system as claimed in claim 4, wherein the predetermined time for one mobile robot is different from that for another mobile robot.

8. A mobile robot control system as claimed in claim 4, wherein the predetermined time is randomly determined.

9. A mobile robot control system as claimed in claim 4, wherein the controller controls the second mobile robot to stop moving during the predetermined time.

10. A mobile robot control system as claimed in claim 4, wherein each mobile robot has a sensor which senses whether or not an obstacle exists on the route, and wherein the signal emitter emits its signal in response to sensing that an obstacle exists on the route.

11. A mobile robot control system as claimed in claim 10, wherein each signal emitter delays the emission of its signal for a period of time after sensing that an obstacle exists on the route, and wherein the delay period for one mobile robot is different from that for the other mobile robot.

12. A mobile robot control system as claimed in claim 11, wherein the delay period for each mobile robot for emitting the signal after detecting the obstacle on the route is randomly determined.

13. A mobile robot moving on a predetermined route, comprising:

a propulsion device;

a sensor which senses whether or not an obstacle exists on the route; and a controller which controls the propulsion device to decrease the speed of the robot when the sensor detects the obstacle, and which controls the sensor to sense again after a predetermined time from the first sensing whether the sensor still detects the obstacle existing on the route at the first sensing.

14. A mobile robot as claimed in claim 13, wherein the controller controls the propulsion device to increase the speed of the robot when the sensor detects that no obstacle exists on the route at the second sensing.

* * * * *